(12) United States Patent
Padovani

(10) Patent No.: US 6,830,425 B2
(45) Date of Patent: Dec. 14, 2004

(54) PROCESS AND PLANT FOR HANDLING THERMOFORMED OBJECTS FOR A SINGLE-STATION THERMOFORMING MACHINE WITH FORM AND CUT MOULD

(75) Inventor: Pietro Padovani, Verona (IT)

(73) Assignee: ISAP OMV Group SpA, Parona (IT)

(*) Notice: Subject to any disclaimer, the term of this patent is extended or adjusted under 35 U.S.C. 154(b) by 49 days.

(21) Appl. No.: 10/077,120

(22) Filed: Feb. 14, 2002

(65) Prior Publication Data

US 2002/0112983 A1 Aug. 22, 2002

(30) Foreign Application Priority Data

Feb. 15, 2001 (IT) .................................. VR2001A0016

(51) Int. Cl.[7] .......................... B65G 57/30; B65G 57/16
(52) U.S. Cl. ................. 414/802; 414/788.3; 414/795.3
(58) Field of Search .......................... 414/795.3, 788.3, 414/791.3, 791.4, 792.2, 802; 198/374

(56) References Cited

U.S. PATENT DOCUMENTS

| | | | | |
|---|---|---|---|---|
| 3,115,090 | A | * 12/1963 | Elander | 414/788.3 X |
| 3,286,810 | A | * 11/1966 | Ripple et al. | 198/374 |
| 3,379,320 | A | * 4/1968 | Loach et al. | 414/788.3 |
| 3,491,633 | A | 1/1970 | White | |
| 3,619,443 | A | 11/1971 | Feldman | 264/89 |
| 3,773,457 | A | 11/1973 | Badoux et al. | 425/388 |
| 4,040,525 | A | * 8/1977 | Tokunaga et al. | 198/374 |
| 4,134,502 | A | * 1/1979 | Seragnoli | 414/790.3 |
| 4,369,015 | A | * 1/1983 | Fabrig | 414/788.3 |
| 4,415,301 | A | * 11/1983 | Zielke | 414/788.3 |
| 4,609,339 | A | 9/1986 | Padovani | 425/383 |
| 4,743,153 | A | * 5/1988 | Kontz | 414/788.3 |
| 5,122,029 | A | * 6/1992 | DelDuca | 414/789.2 |
| 5,417,037 | A | * 5/1995 | Osti et al. | 53/446 |
| 5,591,463 | A | 1/1997 | Padovani | 425/359 |
| 5,871,079 | A | * 2/1999 | Nannini et al. | 198/377.04 |
| 6,290,448 | B1 | * 9/2001 | Focke et al. | 414/222.01 |
| 6,468,024 | B2 | * 10/2002 | Bishop et al. | 414/788.3 |

FOREIGN PATENT DOCUMENTS

| DE | 1 432 263 | 11/1968 |
|---|---|---|
| DE | 1 958 637 | 1/1971 |
| DE | 42 24 009 | 8/1993 |
| DE | 198 12 414 | 9/1999 |
| EP | 0 810 079 | 12/1997 |
| EP | 0 995 582 | 4/2000 |
| EP | 1 075 924 | 2/2001 |
| SU | 597-580 | * 3/1978 |

\* cited by examiner

*Primary Examiner*—Janice L. Krizek
(74) *Attorney, Agent, or Firm*—Ladas & Parry

(57) ABSTRACT

Process and plant for handling and stacking a plurality of thermoformed containers or lids, including the steps of:

obtaining during a thermoforming phase mouldings of lids and containers, having at least three stacking protrusions or spacers, all having the same space arrangement in all the thermoformed products of the same moulding, at least one of the stacking protrusions or spacers of a same thermoformed object being set out in a non specular symmetric way with respect to at least a center line of the respective container or lid and at a distance from the same center line of the respective container or lid different from that of the others, arranging one or a moulding of said containers or lids in at least one support template to keep them in order according to the spatial arrangement that they had during the thermoforming phase, turning through a predetermined angle every other object or moulding of objects either containers or lids before or during their transfer to a stacking station, and stacking mouldings of thermoformed containers or lids with alternate mouldings turned through said predetermined angle, so as to obtain stacks of containers or lids, where the stacking protrusions of a container or lid are offset with respect to those of the next container or lid in each stack.

3 Claims, 5 Drawing Sheets

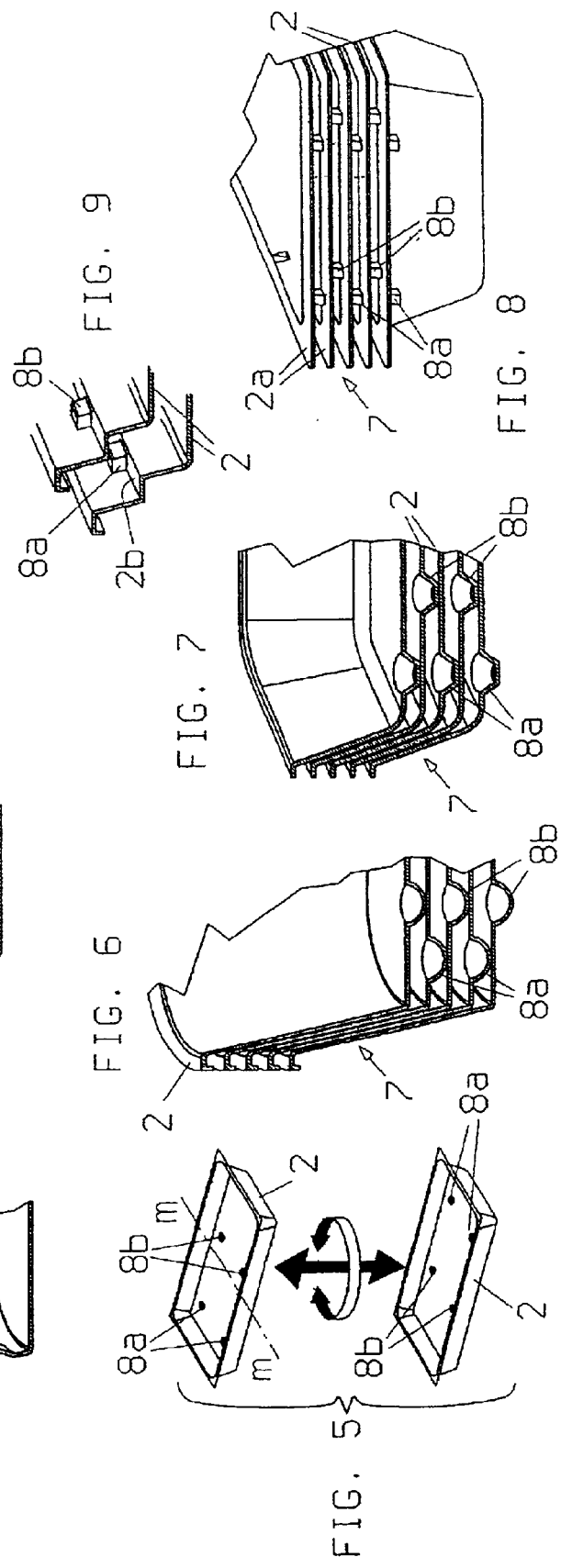
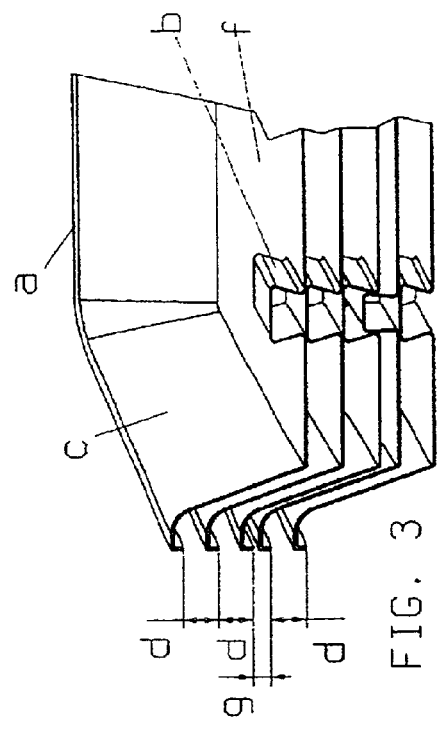
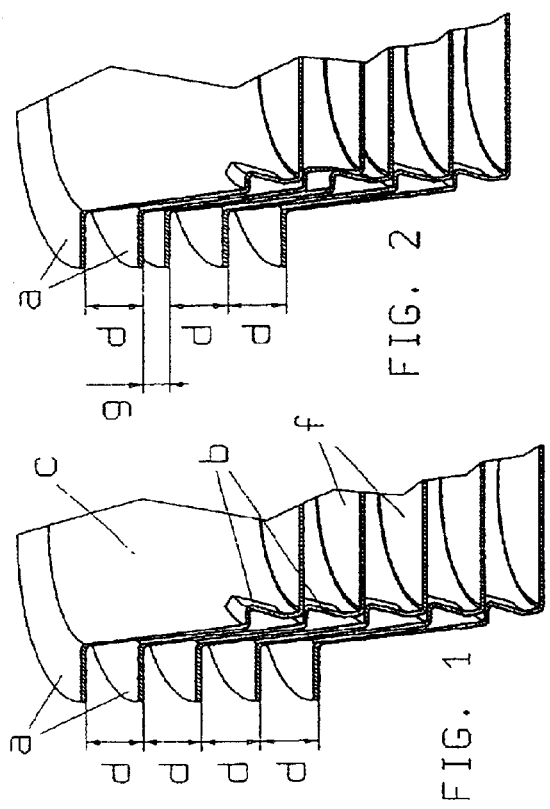

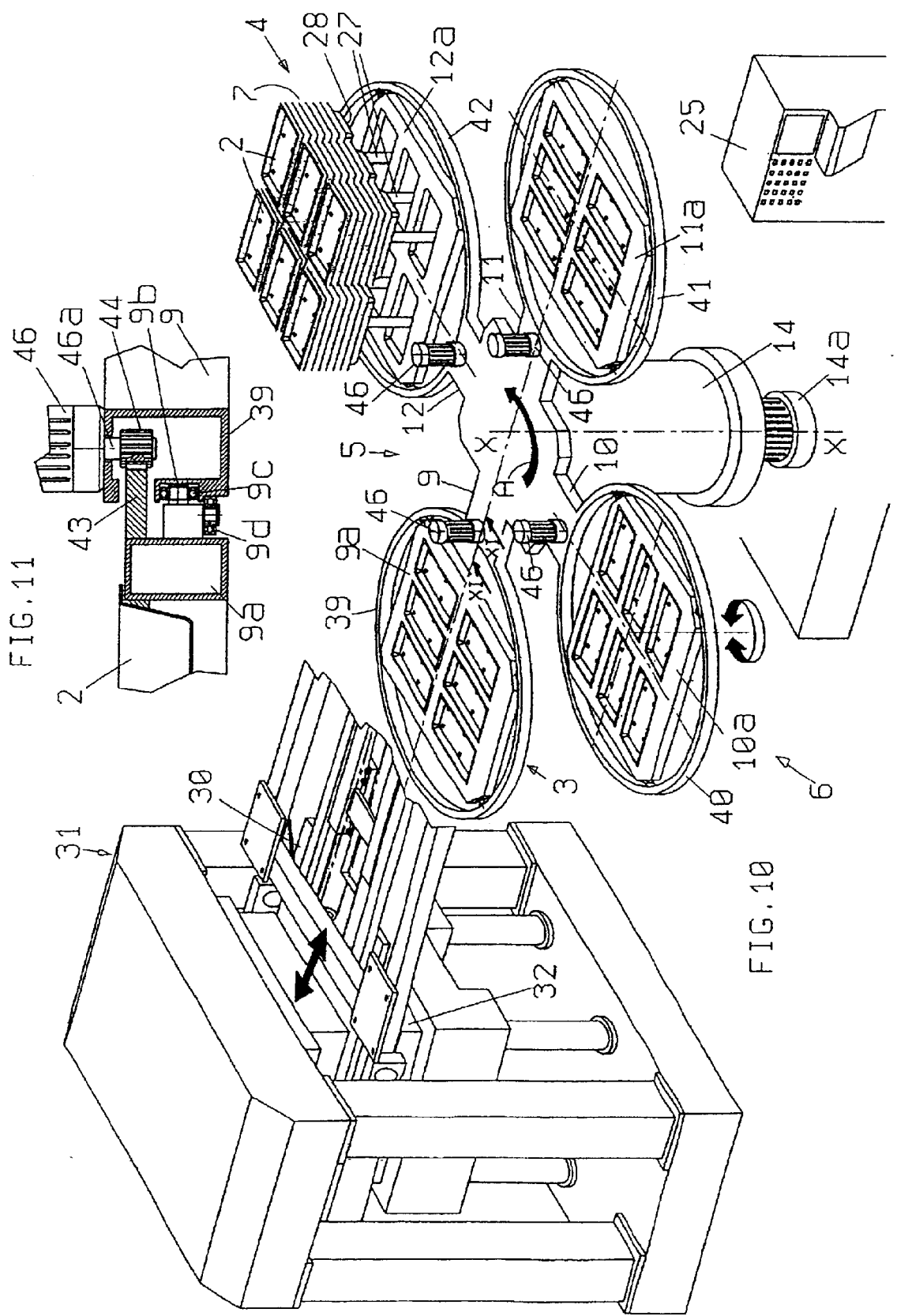

PROCESS AND PLANT FOR HANDLING THERMOFORMED OBJECTS FOR A SINGLE-STATION THERMOFORMING MACHINE WITH FORM AND CUT MOULD

BACKGROUND OF THE INVENTION

The present invention concerns a process and a plant for handling thermoformed objects particularly for a single-station thermoforming machine with form and cut mould.

In the thermoforming field of hollow packaging objects, and in particular for objects of relatively low height and medium or large dimensions, such as lids or containers, for example round and rectangular plates, tubs and the like, it is becoming of crucial importance for the manufacturer to be able to supply the market with thermoformed products, which have been correctly stacked, in perfect axial arrangement and easily de-stackable or removable from the stack. This necessity is increasingly important as the growth of the automatic product packaging sector continues. This means that the stacks of thermoformed products are usually destined to feed an automatic packaging machine and, if the stacks have defects in their axial arrangement or the products in their stacks do not have a constant and uniform index between them, or one or more thermoformed products is stuck in the next or previous container in the stack, impeding or making the separation difficult, the packaging machine stops and needs an operator to intervene, with consequent down time, increase of waste and then packaging costs.

To resolve this problem and in a particular that one of the hollow thermoformed products' reciprocal sticking, it has already been suggested to provide undercut recesses (b) in hollow thermoformed products (a) on the rim or on the wall or lateral walls (c) or on the base (f) of the thermoformed products (see FIG. 1 of attached drawings), such recesses being obtained by providing corresponding fixed or mobile undercutting lugs or projections in the thermoforming mould.

However, if the recesses in the undercut recesses (b) on the side wall or walls are too prominent, the extraction of the thermoformed product from the thermoformed mould becomes difficult; if, instead, they are not very prominent, they are unable to prevent the stacked thermoformed products sticking to each other.

On the other hand, it is difficult, if not prohibitive, to constantly and precisely check a certain number of parameters, namely: thickness, density, fluidity grade etc., of a sheet or belt of thermoformable material in the mould of a thermoforming machine, and obtain therefore uniform and dimensionally perfect undercut recesses in the thermoformed containers.

The recesses obtained with mobile projections in the mould are very expensive to produce and to keep working efficiently. Experience has shown that the mobile projections in the mould frequently stop because of the inevitable dirtying due to the plastic material dust which always accrues in the form and cut mould of the thermoforming machine.

In any case, then, it is known that in stacks of hollow thermoformed products (a) with vibrations and shaking during transport or warehouse handling, the undercutting recesses (b), if not perfect, cause the thermoformed containers or lids making up the single stacks to stick.

For all these reasons, instead of obtaining stacks axially aligned and with thermoformed products (a) kept distant a uniform distance (d) as shown in FIG. 1, uneven stacks are formed with thermoformed products (a) arranged roughly and therefore not uniformly distanced from one to the other (FIG. 2), in as much as the thermoformed products (a) are inevitably subject to sticking to each other, which makes it difficult, if not impossible, to de-stack or separate them before use. Clearly, a stack of thermoformed products (a) not perfectly aligned in an axial direction and with products (a) that are difficult to de-stack, cannot be used in automatic distribution machines or in automatic filling lines for thermoformed containers.

The same problems occur with the undercutting projections (b) when they are provided on the base (f) of thermoformed products, since the projections often stick to each other with the result that the product stacks are defective, as shown in FIG. 3 of the drawings.

SUMMARY OF THE INVENTION

The main object of the present invention is to provide a process and a handling and stacking plant for a plurality of thermoformed objects that can eliminate the difficulties mentioned above with the technical solutions available in the state of art.

According to a first aspect of the present invention there is provided a process for handling and stacking a plurality of thermoformed objects, which is characterized in that it comprises the following sequential phases:

obtaining thermoformed objects or mouldings of thermoformed objects each formed with at least three stacking protrusions or spacers having the same space arrangement in each thermoformed object of the same moulding, at least one stacking protrusion or spacer of a same thermoformed object being located in a non specular symmetric way with respect to at least a centre line of the respective thermoformed object and at a distance from the same centre line different from that of the other protrusions or spacers, arranging one thermoformed object or a moulding of said thermoformed objects in at least one support template to keep them in order according to the spatial arrangement that they had during the thermoforming phase, turning through a predetermined angle around a vertical axis every other thermoformed object or moulding of thermoformed objects before or during their transfer to a stacking station, and stacking thermoformed objects or mouldings of thermoformed objects with alternate objects or mouldings turned through said predetermined angle to obtain stacks of objects, where the stacking protrusions of an object are offset with respect to those of the next object in each stack.

According to another aspect of this invention there is provided a plant for handling and stacking thermoformed objects having at least three projections acting as stacking spacers, at least one of which is arranged at non specular symmetry with respect to at least a centre line of the respective object, said plant including, in sequence, a receiving station for a thermoformed object or a moulding of thermoformed objects, at least one stacking or working station for said thermoformed objects, a stacking station for said thermoformed objects, means for transferring the thermoformed objects from the receiving station to the stacking station through each working or handling station, wherein at least one of the said handling stations includes handling means arranged to rotate through a predetermined angle about a vertical axis every other moulding of thermoformed objects before or during their transfer to said stacking station, thereby obtaining stacks of thermoformed objects lids or containers, where the stacking spacers of an object container or lid are angularly offset with respect to those of the next object.

Advantageously, the transfer devices include a step rotating conveyor.

BRIEF DESCRIPTION OF THE DRAWINGS

Further aspects and advantages of the present invention will become clearer in the following detailed description of some currently preferred embodiments of handling and stacking plants, given by way of non limiting examples with reference to the accompanying drawings, in which:

FIGS. 1 and 2 show a partial cross section view of a stack of thermoformed products with stacking recesses on side walls according to the prior art;

FIG. 3 show a partial view in cross section of a stack of thermoformed products with undercutting recesses on the base of the products according to the prior art;

FIG. 4 is a schematic front view, slightly from above of a handling and stacking plant according to the present invention installed downstream of a single station thermoforming machine with form and cut mould;

FIG. 4*a* shows a detail of FIG. 4;

FIG. 4*b* shows a variant of FIG. 4, in which a thermoformed product is deposited, after having been partially turned, on a thermoformed object that has not been turned;

FIG. 4*c* shows a detail of a stacking station in FIG. 1;

FIG. 5 is a schematic front view of two containers, one on top of the other, and turned 180° one to the other before their reciprocal stacking;

FIGS. 6 and 7 show each a partial cross section of thermoformed objects provided with stacking spacers on the base thereof and stacked according to the process of the present invention;

FIG. 8 is a partial cross section view of thermoformed objects provided with stacking spacers on the rim thereof and stacked according to the process of the present invention;

FIG. 9 shows a partial cross-section of two stacked containers having an intermediate level arranged between base and rim thereof and provided with stacking spacers;

FIG. 10 is a schematic front view, slightly from above, of a second embodiment of the handling and stacking plant according to the present invention installed downstream of a single station thermoforming machine with from and cut mould;

FIG. 11 shows a detail on an enlarged scale and a cross section taken along the line XI—XI of FIG. 10;

In the accompanying drawings similar or same parts or components have been identified with the same reference numerals.

DESCRIPTION OF THE PREFERRED EMBODIMENTS

Figures 4, 4A, 4B, 4C:
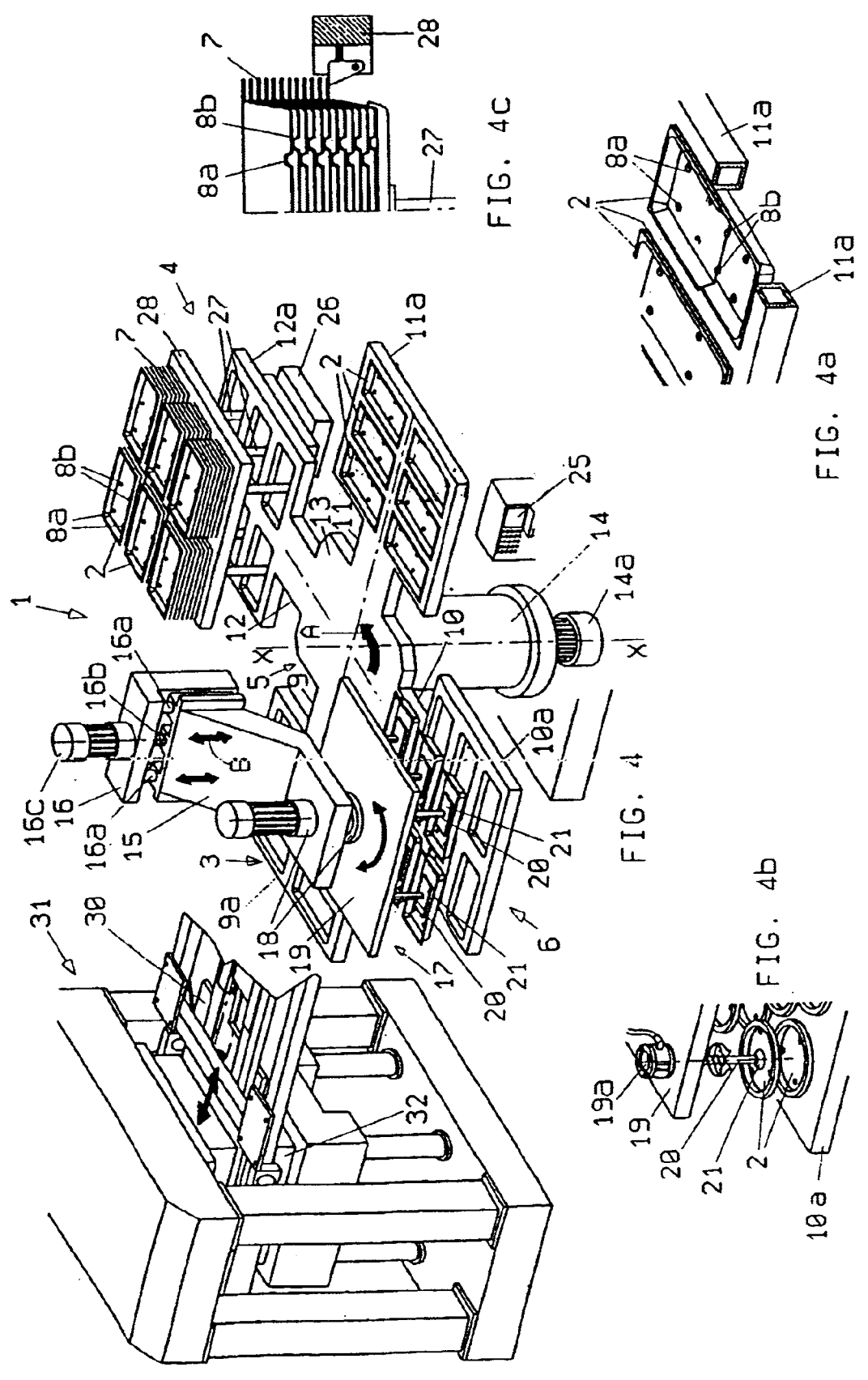
Figure 12:
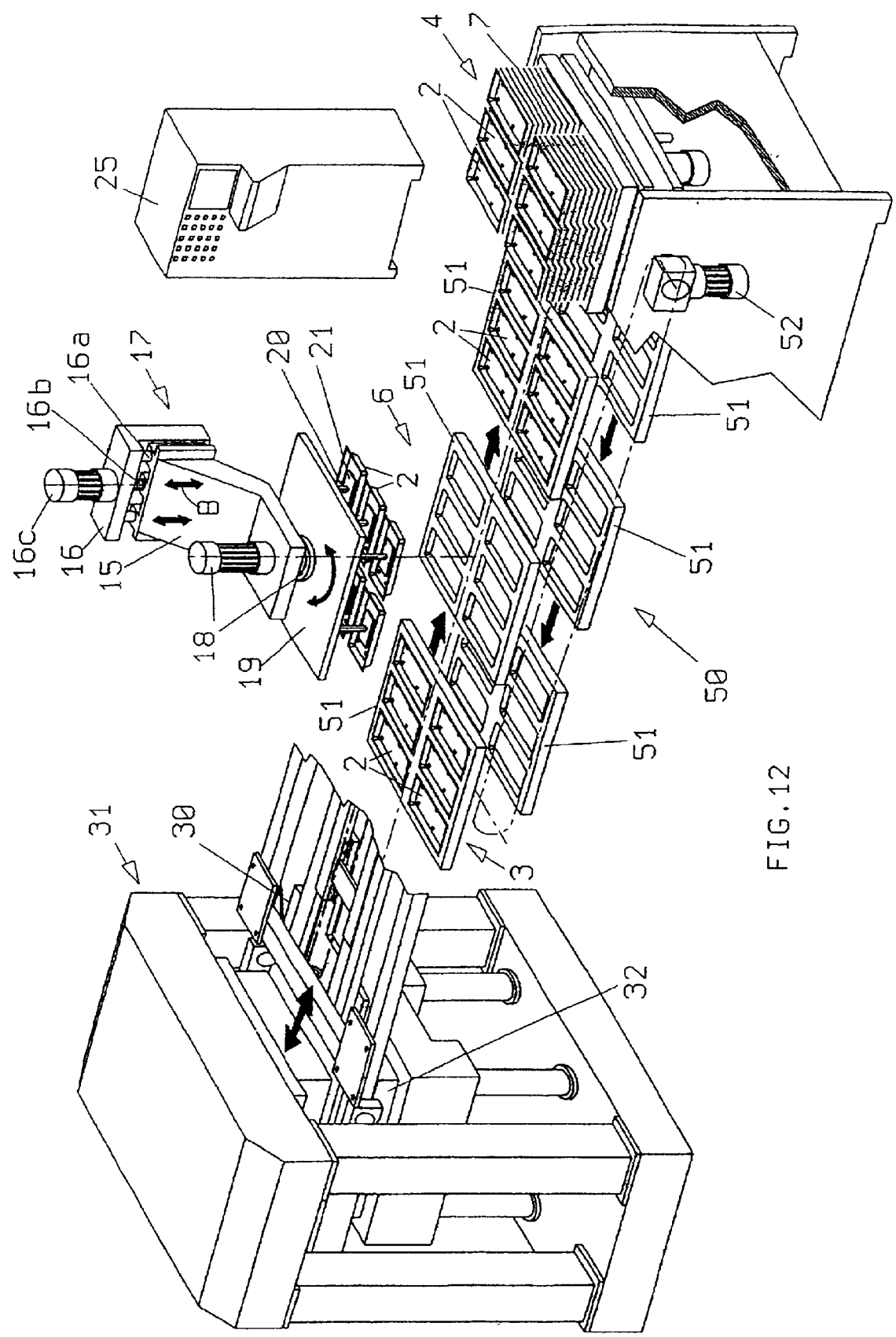
FIG. 12 shows a schematic front view, slightly from above a third embodiment of a handling and stacking plant according to the present invention.

With reference first to all FIGS. 4 to 9, it will be seen that a plant 1, according to the present invention, for handling and stacking thermoformed containers or lids (hereinafter called thermoformed objects or products) 2 comprises, in sequence, a station 3 for receiving or loading a moulding of products 2 (i.e. a group of objects thermoformed together in, and picked up together from the same mould), a step conveyor 5, of the carousel type, a handling station or handling device 6 downstream of the receiving station 3 and designed to cause the alternate moulding of products 2 to rotate through a predetermined angle, and a stacking station 4 for containers and lids 2.

Each thermoformed product 2 (for example, a rectangular tub, as shown in FIGS. 5 and 7 to 9 or a cup as shown in FIG. 6) is produced in a thermoforming machine or press 31 with form and cut mould 32 and with two couples 8*a* and 8*b* of stacking spacers or projections on the base or the rim of the thermoformed product 2 or on a surrounding level between base and rim. A couple of spacers 8*a* are arranged at a distance from the transversal centre line m—m of the respective container 2 not specularly symmetrical with respect to another couple 8*b*, so that, thanks to the alternate rotation of the product mouldings 2 (as will be further explained below), it is possible to obtain stacks 7 of products 2, in which the couples of stacking spacers 8*a* and 8*b* of a thermoformed product 2 are offset with respect to those of the product which follow it or precede in the stack (see FIGS. 5 to 9 in the drawings).

The thermoforming press 31 has a lifting plate 30, for example of the suction type, which picks up the thermoformed products 2 from the mould 32 of the thermoforming press 31 and deposits them on a template frame 9*a*–12*a* of the rotating conveyer 5 positioned in the receiving station 3.

The carousel conveyer 5 has, e.g. four spokes 9, 10, 11, 12 extending at right angles to each other and terminating with a respective template frame 9*a*, 10*a*, 11*a* and 12*a*. The template frames are arranged on the same plane and at the same distance from a vertical axis x-x of common rotation, e.g. in the direction as indicated by an arrow A. The four spokes 9–12 are preferably integral with a central plate 13, in turn supported by, and rotatably mounted in a framework or central mounting 14, in which preferably an electric step motor 14*a* for constant step rotation of the conveyer is also mounted.

The handling station or handling device 6 comprises a support structure, an overhanging arm 15 having one end secured to a fixed support 16, while its other end supports a head or handling device 17 which can rotate about a vertical axis and be raised and lowered. Various methods can be adopted for rising and lowering the head 17, e.g. in FIG. 4 the arm 15 is slidably mounted on the support 16 along a couple of vertical guides 16*a* and is controlled to carry out raising or lowering movements by a screw-nut thread group 16*b* and controlled by a reversible electric motor 16*c*.

Handling device 17 on the free end of the arm 15 comprises e.g. an electric motor—gearbox unit 18 fixed with vertical axis through a passing opening in the arm 15, a plate 19 rotatable around a vertical axis and supported underneath the motor-gear unit 18, and a multiplicity of tubular spacers 20 facing downwards and having their upper end fixed to the lower face of the turning plate 19, while their lower end supports a suction block. The reciprocal distancing of the blocks or suckers 21 is equal to that of the receiving openings of the thermoformed products 2 provided in each template or template frame 9*a*–12*a*, so that when the handling device is lowered by the motor 16*c* on a template, the blocks or suckers 21 go to rest and engage the base of the thermoformed products 2 carried by the templates. Each block or sucker 21, through its spacer 20 and suitable tubing, e.g. in the turning plate 19, can be connected through pilot valves, for example, controlled by a programmable control unit 25, with a vacuum source (not shown in drawings) of any suitable type.

As illustrated in FIG. 4b, once the handling group 17 has removed the thermoformed products 2 from a template 9a–12a and has carried out a predetermined angular movement, the turned thermoformed products 2 can be positioned directly on the template from which they have been taken or on the template which follows immediately and is loaded with thermoformed products 2 which have not been turned.

The stacking station 4 can be of any suitable type, e.g. the type with a lower platen 26 which supports a plurality of pushing devices 27, which push upwards from underneath the moulding of products 2 brought for example by the template frame 12a once it has reached a correct position above the platen 26, and an upper fixed frame 28 on which stacks 7 of thermoformed products 2 are formed and supported in a manner well known in the art as shown in FIG. 4c. The resulting stacks 7 are formed by thermoformed objects 2, which having been turned through 180° in alternate mouldings by the handling group17 are stacked as shown in FIGS. 6 to 9, i.e. with a couple of stacking protrusions 8a of one container arranged above, but offset so as not to interfere with the couple of stacking protrusions 8b of the lower container. Thanks to this reciprocal misalignment of the stacking protrusions, it is possible to completely avoid having the protrusions, and therefore the products 2, stick one inside the other, thereby constantly obtaining stacks 7 of thermoformed products 2 always axially aligned and, therefore, always positioned perfectly even during transport and handling after stacking.

FIGS. 8 and 9 show in detail stacking protrusions 8a and 8b, which are provided in the flat rim or flange 2a of each thermoformed product 2 or at a surrounding level 2b positioned between the base and the free rim of the containers 2.

FIG. 10 shows a variant of the embodiment shown in FIG. 4. In the rotating conveyor 5 the arms or spokes from 9 to 12 terminate with a respective circular support frame, respectively 39, 40, 41 and 42, within which a respective template 9a–12a is supported and can be rotated. In particular, each arm 9–12 supports at the circular supporting frame (as better seen in FIG. 11) an electric motor 46 with a vertical axis, on whose output shaft 46a a pinion 44 is keyed which meshes with a circular rack or a length of circular rack 43 integral in rotation with the respective template, for example 9a. The template 9a is preferably rotatably supported on a respective template frame 39–42 by at least three radial pins 9b–12b (only pin 9b being visible in the drawings) which are mounted on a respective ball bearing 9c–12c and guided by bearings 9d–12d on a vertical axis which roll on the internal wall of the respective circular frame 39–42.

In use, during transfer from the receiving station 3 or during the stop at the handling station 6, the motor of the arm 9–12 concerned is energized by a program control unit 25, so as to cause a partial rotation, for example through 180°, of every other template 9a–12a loaded with thermoformed products 2, so as to obtain stacks 7 of thermoformed products 2 at the stacking station 4, as shown in FIGS. 6 to 9.

If desired, the handling device 7, after having caused a moulding of thermoformed products 2 picked up from a template 9a–12a in the handling station 6 partly to rotate, can load the turned moulding on a successive template already loaded with thermoformed products 2, not turned, and thus the turned products 2 are pre-stacked (see FIG. 4a), which enables the number of cycles in the time unit to be increased.

In the embodiment of a plant according to the present invention shown in FIG. 12 there is shown a linear conveyor 50 for templates 51, e.g. of the type having an upper forward run and a lower return run and a step drive motor 52.

At a position upstream of the upper forward run there is provided a receiving station 3, where the thermoformed products 2 are loaded by the pick up plate 30 in the template 51 which at that moment is waiting in the receiving station 3. In an intermediate position downstream of the receiving station, there is provided a rotating station arranged to cause every other template 51 to rotate through a predetermined angle, such a rotation being carried out by a handling device 17, e.g. one similar to that shown in FIG. 4. At the end of the upper forward run there is provided a stacking station 4, e.g. a stacking station as that described with reference to FIG. 4, where the thermoformed products 2 are stacked alternately turned to obtain stacks 7 as illustrated in FIGS. 6 to 9.

Figure 13:
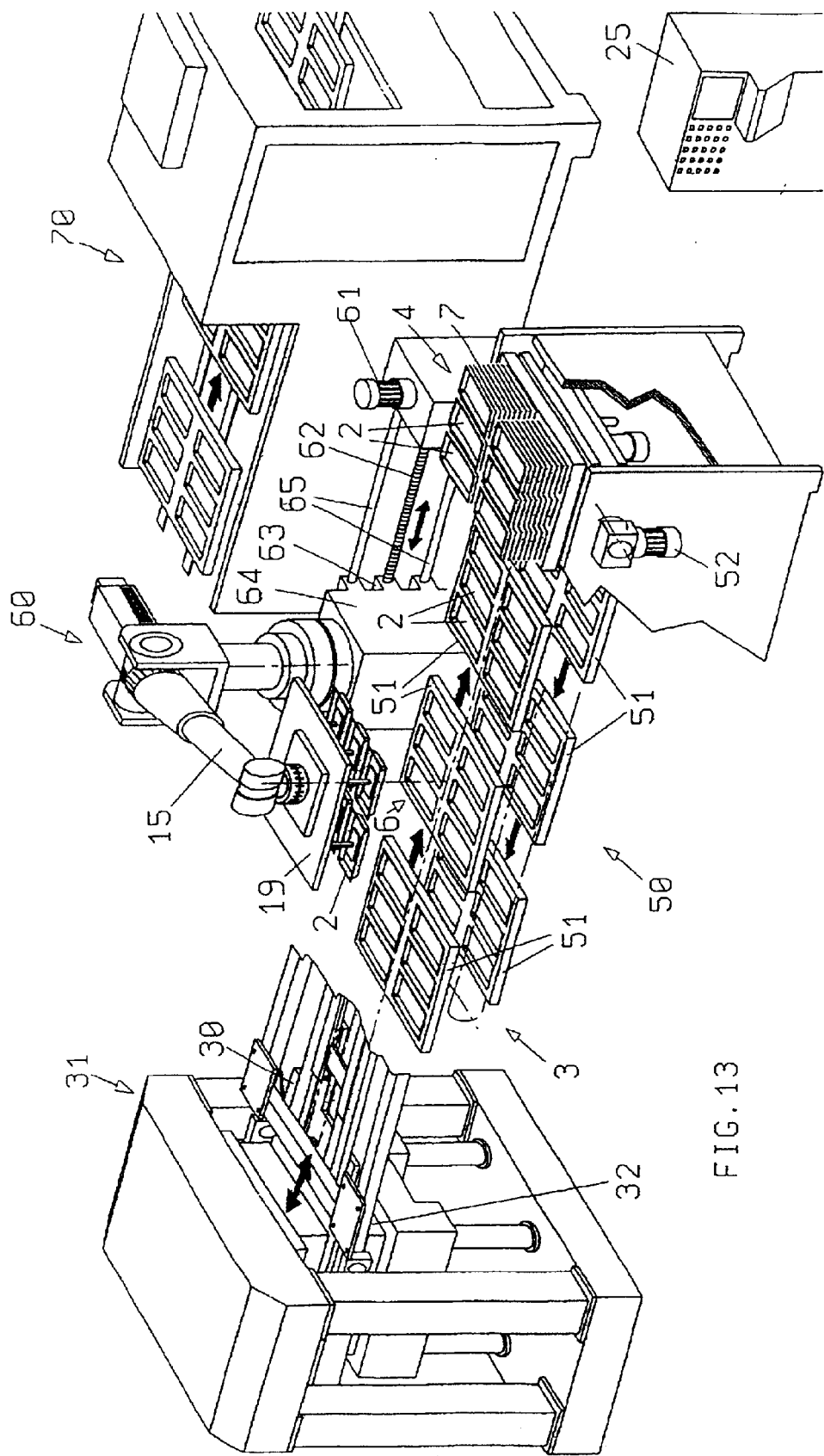
FIG. 13 shows a variant of the plant in FIG. 12.

FIG. 13 shows a variant of the plant of FIG. 12, in which the handling device is a robot structure 60, which carries out the rotation of a moulding of thermoformed products 2 transported on a template conveyor 50 and can also carry out, upon control of a control unit 25, the picking up of sample mouldings of products 2 to transfer them, for example onto a template 71 on a second conveyor 70 nearby, in order to be tested or transferred to a second handling or stacking line.

To this end, the robot 60 can have a telescopic arm 15, that can oscillate around a horizontal axis and turn around a vertical axis. Additionally, the robot 60 can move, e.g. in a parallel fashion to the conveyor 50, for example to position a moulding of thermoformed products 2 on the conveyer 50 in a different position to that of the picking up, owing to a reversible drive motor 61 that, e.g. through a gear unit, causes a drive screw 62 to rotate, which engages in a nut screw 63 secured to, or integral with, the base 64 of the robot. Advantageously, the base 64 can slide along straight guides 65 which extend parallel to the control screw 62.

The above described plant is subject to numerous modifications and variations within the scope of the claims.

For example, in the embodiment illustrated in FIG. 10, the partial rotation movement of the templates 9a–12a can also be directly derived from the motion of rotation of the conveyor 5 by using a suitable transmission system.

The disclosure in the Italian patent application no. VR2001A00016 filed on Feb. 15, 2001 from which priority is claimed is incorporated herein by reference. Any reference sign following technical features in any claim has been provided to increase intelligibility of the claim and shall not be construed as limiting the scope of the claim.

What is claimed is:

1. A process for handling and stacking a plurality of thermoformed objects, which comprises the following steps:

obtaining thermoformed objects each formed with at least three stacking protrusions or spacers arranged in a same pattern on the bottom of each thermoformed object, at least one stacking protrusion or spacer being located in such a way as to be out of symmetry with respect to other stacking protrusions with respect to a centre line (m—m), arranging said thermoformed objects on a support template to keep them in order, rotating every other thermoformed object by a predetermined angle before or during their transfer to a stacking station, and stacking the thermoformed objects with alternate thermoformed objects rotated by said predetermined angle to obtain stacks of thermoformed objects, wherein the stacking protrusions of a thermoformed object are offset with respect to those of the next thermoformed object in each stack.

2. A process according to claim 1, wherein the step of turning the thermoformed objects includes:

picking up thermoformed objects from a supporting template, rotating the thermoformed objects about a vertical axis, while the thermoformed objects are lifted, and placing the thermoformed objects rotated through the predetermined angle on the same template or on another template loaded with thermoformed objects that have not been turned.

3. A process according to claim 1, wherein the thermoformed objects are rotated through an angle of 180°.

* * * * *